United States Patent
Oh

(10) Patent No.: US 7,254,738 B1
(45) Date of Patent: Aug. 7, 2007

(54) METHOD FOR PROCESSING ERROR OF RECEIVED PACKET IN ETHERNET MAC LAYER

(75) Inventor: Seung-Hwan Oh, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 431 days.

(21) Appl. No.: 09/473,846

(22) Filed: Dec. 28, 1999

(30) Foreign Application Priority Data

Dec. 28, 1998 (KR) .................................. 98-59204

(51) Int. Cl.
*G06F 11/00* (2006.01)
(52) U.S. Cl. ........................................... 714/4; 714/48
(58) Field of Classification Search .............. 714/48, 714/18, 4
See application file for complete search history.

(56) References Cited

U.S. PATENT DOCUMENTS

| | | | | |
|---|---|---|---|---|
| 5,493,562 A | * | 2/1996 | Lo | .............. 714/748 |
| 5,596,575 A | * | 1/1997 | Yang et al. | .................. 370/468 |
| 5,764,641 A | * | 6/1998 | Lin | ............................ 370/412 |
| 5,859,837 A | * | 1/1999 | Crayford | .................... 370/230 |
| 5,999,538 A | * | 12/1999 | Haddock et al. | ............ 370/446 |
| 6,101,191 A | * | 8/2000 | Hashimoto et al. | ......... 370/420 |
| 6,246,702 B1 | * | 6/2001 | Fellman et al. | ............. 370/503 |
| 6,292,467 B1 | * | 9/2001 | Keller | ......................... 370/241 |
| 6,295,281 B1 | * | 9/2001 | Itkowsky et al. | ........... 370/293 |
| 6,360,335 B1 | * | 3/2002 | Dawson | ....................... 714/39 |

* cited by examiner

*Primary Examiner*—Marc Duncan
(74) *Attorney, Agent, or Firm*—Cha & Reiter, L.L.C.

(57) ABSTRACT

A method for processing a received packet in a MAC (Medium Access Control) layer of an Ethernet which receives a packet from a physical layer and transmits the received packet to a switch. The method includes the steps of detecting an error while receiving the packet from the physical layer; upon failure to detect error, transmitting the received packet to the switch; and, upon detection of error, stopping the transmission of the received packet to the switch.

3 Claims, 3 Drawing Sheets

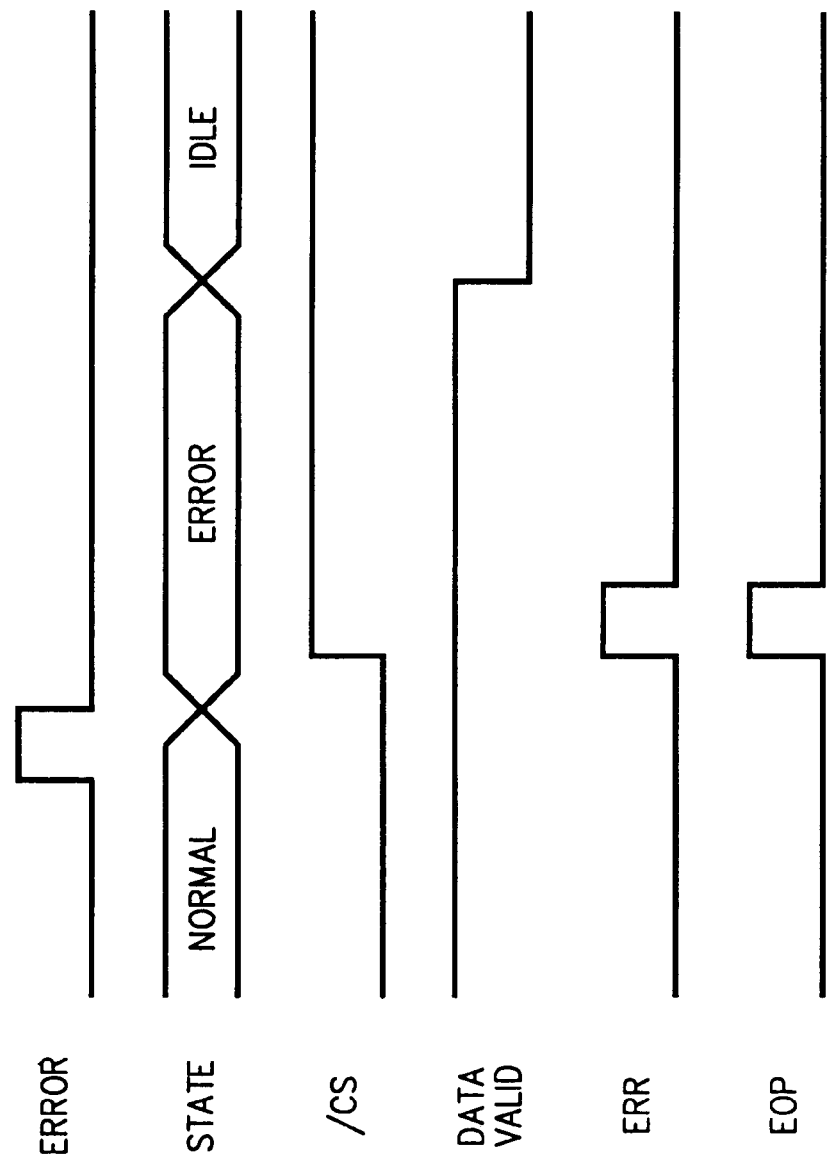

METHOD FOR PROCESSING ERROR OF RECEIVED PACKET IN ETHERNET MAC LAYER

CLAIM OF PRIORITY

This application makes reference to, incorporates the same herein, and claims all benefits accruing under 35 U.S.C. Section 119 from an application for "Method for Processing Error of Received Packet in Ethernet MAC Layer" filed in the Korean Industrial Property Office on Dec. 28, 1998 and there duly assigned Serial No. 98-59204.

BACKGROUND OF THE INVENTION

1. Field of the Invention

The present invention relates generally to a method for processing a received packet in a MAC (Medium Access Control) layer of an Ethernet, and in particular, to a method for processing an error in the received packet.

2. Description of the Related Art

A local area network (LAN) interconnects a group of data communication terminals within a limited area. This type of LAN topology is classified into bus type, ring type, star type and tree type. The bus type network is the most commonly used network, and the Ethernet is one of the oldest communication protocols for communication terminals implemented in the bus physical topology.

Meanwhile, a MAC layer of the Ethernet processes a packet received from a physical layer. When an error occurs during the reception of data from the physical layer, the MAC layer performs the corresponding error processing operation. More specifically, when an error occurs in the packet exceeding 64 bytes while receiving the packet from the physical layer, the MAC layer receives the entire packet and transmits the received packet to the next stage along with an error signal indicating the occurrence of an error in the received packet. A MAC protocol standard and a logical link control (LLC) protocol standard, including the error processing method for the received data in the MAC layer, have been published by the IEEE (Institute of Electrical and Electronics Engineers) 802 Committee and certified by ISO (International Standard Organization).

According to the above standards, when an error occurs in the packet not exceeding 64 bytes while receiving the packet, the MAC layer will discard the error packet. However, when an error occurs in a packet exceeding 64 bytes, the MAC layer will receive the entire packet and transmit the received packet to the next stage (e.g., switch), along with an error signal indicating the occurrence of the error. Therefore, the receipt of the unnecessary error packet causes an increase in the overhead of the system. In particular, a switch in the next stage receiving the error packet wastes time by receiving the unnecessary error packet, thereby causing a degradation of the system performance.

SUMMARY OF THE INVENTION

It is, therefore, an object of the present invention to provide a method for reducing an overhead due to the reception of error packets in an MAC layer of the Ethernet.

It is another object of the present invention to provide a method for saving the time wasted by receiving the unnecessary packet in a MAC layer of the Ethernet.

It is further another object of the present invention to provide a method for improving the receiving capability in a MAC layer of the Ethernet.

To achieve the above objects, there is provided a method for processing a received packet in a MAC (Medium Access Control) layer of an Ethernet which receives a packet from a physical layer and transmits the received packet to a switch.

In accordance with one aspect of the present invention, a method for processing a received packet in a MAC layer comprises the steps of detecting an error while receiving the packet from the physical layer; transmitting the received packet to the switch upon the failure to detect an error; and, stop the transmission of the receiving packet to the switch upon detecting an error.

In accordance with another aspect of the present invention, a method for processing a received packet in a MAC layer comprises the steps of receiving a packet from the physical layer and storing the received packet in the FIFO (First-In, First-Out) memory; detecting error while receiving the packet; stopping the storage of the received packet to the FIFO memory upon the detection of error; and, transmitting a signal indicating the occurrence of error and a signal indicating the end of the received packet to the switch. Further, the method comprises the step of preparing to receive the next packet from the physical layer, after receiving the error packet.

A BRIEF DESCRIPTION OF THE DRAWINGS

The above and other objects, features and advantages of the present invention will become more apparent from the following detailed description when taken in conjunction with the accompanying drawings in which.

A DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
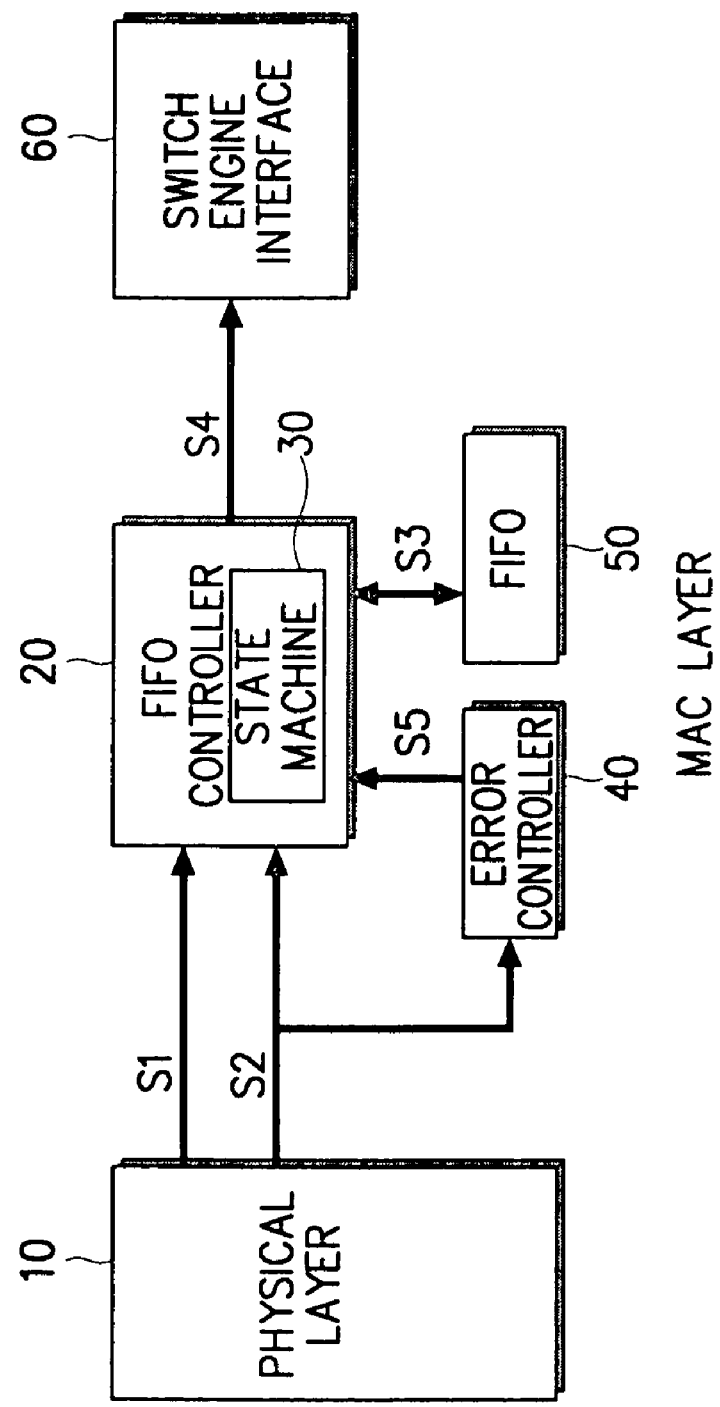
FIG. 1 is a block diagram illustrating a scheme for processing the received packet in an Ethernet MAC layer according to an embodiment of the present invention.

FIG. 1 shows a configuration according to an embodiment of the present invention for processing error in a received packet in a MAC layer. The MAC layer stores the packet received from a physical layer 10 in a FIFO (First-In, First-Out) memory 50 and transmits the stored packet to a switch (not shown) in the next stage through a switch engine interface 60. Such MAC layer includes a FIFO controller 20, an error controller 40, and the FIFO memory 50. The FIFO controller 20 also includes a state machine 30.

In FIG. 1, when the FIFO controller 20 receives a packet S2 from the physical layer 10, the error controller 40 examines whether the received packet (e.g., 4 bits) contains an error. The error controller 40 checks for a collision of the received packet, an overflow of the FIFO memory 50, and the parity and the CRC (Cyclic Redundancy Code) of the received packet, to examine whether the received packet has error. When it is determined that the received packet contains error, the error controller 40 provides the FIFO controller 20 with an error signal S5. The FIFO memory 50 stores the packet received from the physical layer 10 and then transmits the stored packet to the switch engine interface 60 in response to a control signal S3 from the FIFO controller 20. The FIFO controller 20 controls the operation of storing the packet received from the physical layer 10 in the FIFO memory 50 and then transmitting the stored packet to the switch engine interface 60, using the control signal S3. Here, an output enable signal OEN, a write enable signal WEN or a chip select signal /CS can be used for the control signal S3. The state machine 30 included in the FIFO controller 20 determines the operating state of the FIFO controller 20 according to the error signal S5 from the error controller 40. In the embodiment of the present invention, the FIFO controller 20 operates in an idle state, a normal state or an error state according to the state machine 30.

Further, the reference letter S1 denotes a signal indicating the reception of a packet from the physical layer 10, and the reference letter S4 denotes a signal ERR indicating the occurrence of error during the receipt of the packet in the FIFO controller 20 and a signal EOP (End of Packet) indicating the completion of receiving the packet.

Figure 2:
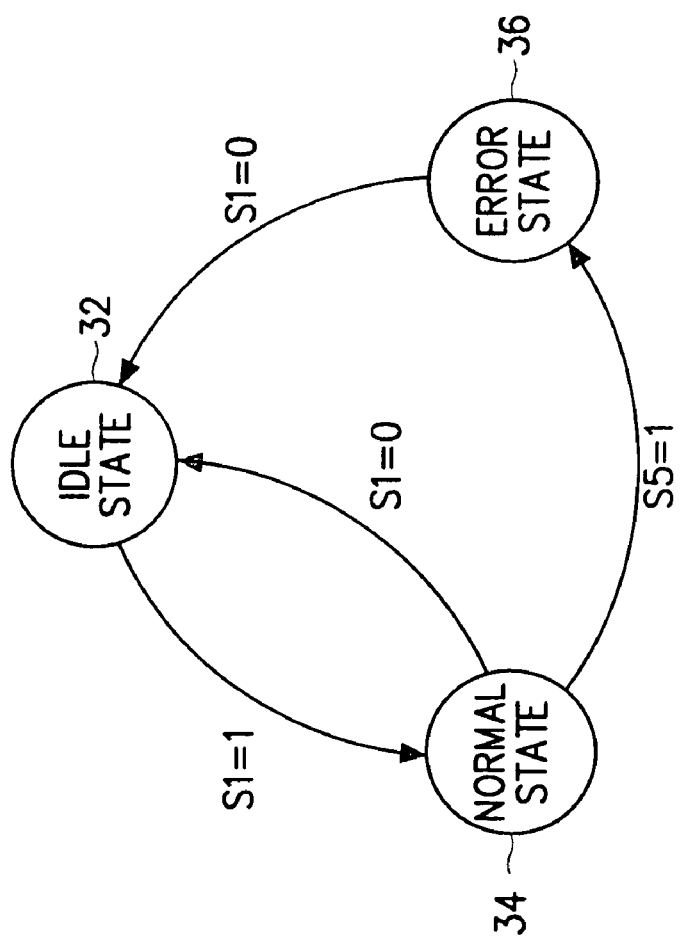
FIG. 2 is a state diagram illustrating a procedure for processing the received data according to the configuration shown in FIG. 1; and, FIG. 3 is a timing diagram illustrating the error processing operation for a received packet which is performed in the FIFO controller of FIG. 1.

FIG. 2 is a state diagram illustrating an operating state of the FIFO controller 20, determined by the state machine 30. FIG. 3 is a timing diagram illustrating an error processing operation for the received packet which is performed in the FIFO controller 20 of FIG. 1.

When the error controller 40 determines that a new packet has been normally received from the physical layer 10 of FIG. 1, the FIFO controller 20 stores the received packet in the FIFO memory 50 and then transmits the stored packet to the switch engine interface 60. When the normal packet is received normally, the S1 signal (or data valid signal) is represented by "1." In this case, the FIFO controller 20 operates in the normal state 34.

However, when the error controller 40 determines that an error has occurred while transmitting the received packet to the switch engine interface 60 (i.e., when S5="1"), the FIFO controller 20 changes to the error state 36. In this situation, the FIFO controller 20 stops transmitting the received packet to the switch engine interface 60. More specifically, the FIFO controller 20 provides a chip select signal /CS of level "1', as shown in FIG. 3, to "the FIFO memory 50 to prevent the received packet from being stored in the FIFO memory 50, and at the same time, provides the error signal ERR and the end-of-packet signal EOP to the switch engine interface 60.

In prior art, when an error occurs during the reception mode of the packet, the FIFO controller 20 receives the entire error packet and transmits it to the switch engine interface 60. When an error occurs at the time where the end of the packet is completely received, the FIFO controller 20 provides the switch engine interface 60 with a signal indicating the complete reception mode of the packet.

During the error processing operation in error state 36, upon the receipt of the S1 signal of level "0" indicating that there is no packet to be received from the physical layer 10, the FIFO controller 20 converts to the idle state 32. In the idle state 32, the FIFO controller 20 prepares to receive the next packet from the physical layer 10.

As described above, upon the receipt of an error packet from the physical layer, the MAC layer discards the error packet and at the same time provides a switch in the next stage with a signal indicating the occurrence of an error. In this manner, it is possible to reduce an overhead due to the reception of the error packet in the MAC layer. In addition, it is possible to save the time wasted as a result of receiving the unnecessary packet. In summary, it is possible to improve the receiving capability in the MAC layer of the Ethernet.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for processing, by an Ethernet MAC (Medium Access Control) layer, a packet received from a physical layer and intended, after reception, for storage in a storage memory at the MAC layer and transmission, after storage of the packet in said storage memory, to a layer above the MAC layer, the packet having a size, comprising:
   detecting for error while receiving, at the MAC layer, said packet from the physical layer; and,
   upon detection of error,
   a) regardless of said size, preventing the storage, of said packet, in said storage memory at the MAC layer, thereby preventing said transmission to said layer above; and
   b) sending, to said layer above, a signal indicating occurrence of error and a signal indicating an end of said packet.

2. The method as claimed in claim 1, further comprising preparing to receive a next packet from the physical layer after receiving the packet in which the error is detected.

3. The method as claimed in claim 1, wherein said storage memory comprises a FIFO (First-In, First-Out) memory.

* * * * *